United States Patent

Harries et al.

[11] 4,050,749
[45] Sept. 27, 1977

[54] CONTROL VALVE ASSEMBLIES FOR VEHICLE ANTI-SKID BRAKING SYSTEMS

[75] Inventors: David Anthony Harries; Ivan Mortimer, both of Solihull, England

[73] Assignee: Girling Limited, Birmingham, England

[21] Appl. No.: 759,897

[22] Filed: Jan. 17, 1977

[30] Foreign Application Priority Data

Mar. 10, 1976 United Kingdom ............... 09467/76

[51] Int. Cl.² ............................................. B60T 8/08
[52] U.S. Cl. ............................... 303/119; 188/181 A
[58] Field of Search ................... 188/181 A; 303/113, 303/115, 117, 119

[56] References Cited

U.S. PATENT DOCUMENTS 3,617,098  11/1971  Leiber ................................... 303/119
3,741,611  6/1973  Depenheuer .......................... 303/119
3,909,073  9/1975  de Gennes ........................... 303/119

Primary Examiner—Duane A. Reger
Attorney, Agent, or Firm—Scrivener, Parker, Scrivener & Clarke

[57] ABSTRACT

In a control valve assembly for a vehicle hydraulic braking system a differential piston works in a stepped bore in the housing of the valve and is exposed at its end of greater area to an inlet port and at its end of smaller area to a chamber in the valve, the inlet port communicating at all times with the chamber through a restricted passage in the piston, and the chamber communicating with a further chamber in which a valve is located at least when the valve is in a first position in which the inlet port is in communication through the chambers with an outlet port for connection to the wheel brake.

7 Claims, 1 Drawing Figure

U.S. Patent  Sept. 27, 1977  4,050,749
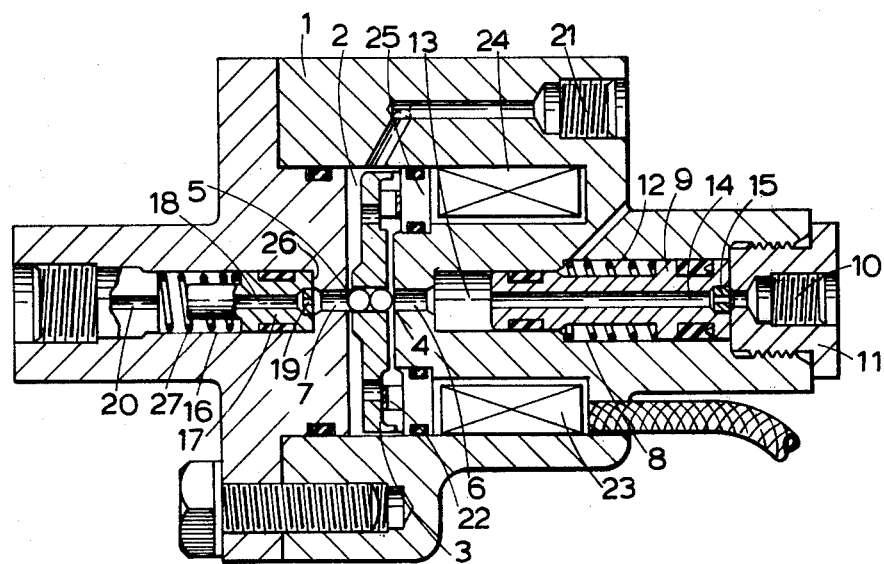

CONTROL VALVE ASSEMBLIES FOR VEHICLE ANTI-SKID BRAKING SYSTEMS

This invention relates to control valve assemblies for vehicle hydraulic braking systems of the kind comprising a housing having an inlet port for connection to a supply of hydraulic fluid under pressure, an outlet port for connection to a wheel brake, and a pressure-relief port for connection to a reservoir for fluid, valve means in a first chamber in the housing movable between a first position in which the inlet port is in communication through the chamber with the outlet port and communication between the chamber and the pressure-relief port is closed, and a second position in which communication between the inlet port and the chamber is cut-off and the outlet port is in communication through the chamber with the pressure-relief port, and resilient means for urging the valve means into the first position.

In known hydraulic braking systems for vehicles, when a brake is applied, initially a relatively large volume of fluid is displaced for a small increase in pressure, for example while the braking clearances are being taken up, and thereafter the pressure increases at a rate greater than that at which the volume increases until, finally, there is a relatively large pressure increase for displacement of a relatively small volume of fluid.

In an anti-skid hydraulic braking system it is desirable to relieve the brake applying pressure rapidly but without reducing or exhausting a substantial volume of fluid which otherwise would have to be replaced before the brake could be re-applied following a skid.

According to our invention in a control valve assembly for a vehicle braking system a differential piston working in a stepped bore in the housing is exposed at its end of greater area to the inlet port and at its end of smaller area to a second chamber communicating with the first at least when the valve means is in the first position and defined in the bore between the end of the piston which is of smaller area and the adjacent inner end of the bore, and the inlet port communicates at all times with the second chamber through a restricted passage in the piston.

When a brake connected to the outlet port is to be applied high pressure fluid of the inlet port passes through the restricted passage to the outlet port and a consequent pressure drop advances the differential piston so that an initial large volume of fluid is displaced to the brake and thereafter the small volume passing through the restricted passage is sufficient to increase the pressure to apply the brake.

The valve assembly is preferably incorporated in an anti-skid braking system and includes anti-skid control means responsive to deceleration of a braked wheel for urging the valve means into the second position when the deceleration of the braked wheel exceeds a predetermined value, the assembly also including a restriction providing communication between the first chamber and the pressure relief-port at least when the valve means is in the second position. When the anti-skid control means urge the valve into the second position the volume of fluid exhausted from the first chamber is controlled by the restriction so that a large pressure reduction is obtained for a relatively small loss in volume. Thus, at the termination of the skid, substantially the whole of the initial large volume required for the subsequent brake application will already have been trapped in the system. Hence the necessary controlled rate of pressure rise to apply the brake is readily obtained.

Conveniently the restricted passage in the piston comprises an axial through bore having at its outer end adjacent to the inlet port an orifice across which the pressure drop occurs to advance the piston in the bore.

Preferably the restriction comprises a restricted passage in a further piston working in a bore between the first chamber and the relief port, and the piston is displaceable in the bore in a direction away from the first chamber against the loading in a return spring normally urging the piston into an advanced position against a stop defined by a step in diameter between the bore and a passage through which the bore communicates with the first chamber at least when the valve means is in the second position.

Conveniently the restriction in the said further piston comprises an axial bore having at its inner end adjacent to the step an orifice across which a pressure drop occurs to urge the piston away from the stop when the valve means is in the second position.

In one construction the valve means comprises a double-acting valve member of magnetic material and the anti-skid control means comprises a solenoid assembly for urging the valve member into the second position magnetically.

One embodiment of our invention is illustrated in the single FIGURE of the accompanying drawing which is a longitudinal section through control valve assembly for a vehicle anti-skid braking system.

In the control valve assembly a housing 1 has a first central radial chamber 2 in which is located valve means comprising a double-acting valve member 3 for alternate engagement with valve seatings 4 and 5 at the respective inner ends of the axially aligned oppositely extending passages 6 and 7.

The passage 6 leads into the smaller diameter end of a stepped bore 8 in which works a differential piston 9 exposed at its opposite end to an inlet port 10 in a closure plug 11 for the end of the bore 8 which is of greater diameter and into engagement with which the piston 9 is urged in an inoperative position by means of a compression spring 12 located in an intermediate chamber in the bore 8 exposed to atmosphere. A second chamber 13 defined in the bore 8 between the inner end of the piston 9 and the passage 6 communicates at all times with the inlet port 10 through an open-ended axial through-bore 14 in the piston 9 and an orifice 15 at its outer end adjacent to the plug.

The passage 7 leads into the inner end of a bore 16 in which works a piston 17 and the piston 17 has an open-ended axial through-bore 18 in the inner end of which is located an orifice 19 to provide communication at all times between the passage 7 and a relief port 20 for connection to a reservoir for fluid.

An outlet port 21 for connection to a wheel brake leads from the first chamber 2.

The valve member 3 is of magnetic material and is usually urged by a corrugated spring washer 22 into a first position in engagement with the seating 5 to cut-off communication between the first chamber 2 and the outlet port 18.

Anti-skid control means comprising a solenoid 23 is located in an annular recess 24 in the housing and the open end of the recess is closed by a sealing plate 25 constituting a portion of an end wall of the first chamber 2 and forming an abutment for the corrugated spring washer 22. The solenoid is adapted to be energised by an electrical current generated by means responsive to rotation of a brake wheel and, when the deceleration of the wheel exceeds a predetermined value and a skid occurs, the solenoid 23 urges the valve member 3 against the force in the spring 24 into a second position in which communication between the passage 6 and the first chamber 2 is cut-off and the outlet port 21 is placed in communication with the relief port 20.

When the inlet port 10 is connected to a source of fluid under pressure, for example a master cylinder, the outlet port 21 is connected to a wheel brake and the relief port 20 to a reservoir for fluid, when the system is properly bled, fluid is present in the second chamber 13 and the valve member 3 is in the first position.

When the brake is to be applied by actuation of the master cylinder, initially high pressure fluid acts on the end of the piston 9 which is of greater area and pressure drop occurs across the orifice 15 so that the differential piston 9 is advanced into the second chamber 13, against the force in the spring 12. This displaces a large volume of fluid into the brake system and, thereafter a relatively small volume passing through the orifice 15 is sufficient to create a pressure increase necessary to apply the brake.

When the valve member 3 is urged into the second position by the solenoid 23, the outlet port 21 is placed in communication with the relief port 20 and the volume of fluid exhausted from the brake system is controlled by retraction of the piston 17 away from a stop 26 defined by a step between the passage 7 and the bore 16 and against the force in a return spring 27 and a pressure-drop across the orifice 19. The orifice 19 is effective to control the volume of fluid returned to the reservoir and the rate of pressure fall. Hence a rise in brake pressure for brake re-application at the termination of the skid will be controlled by the orifice 10, and the necessary controlled rate of pressure rise to apply the brake is readily obtained.

We claim:

1. A control valve assembly for a vehicle hydraulic braking system comprising a housing having an inlet port for connection to a supply of hydraulic fluid under pressure, an outlet port for connection to a wheel brake, and a pressure-relief port for connection to a reservoir for fluid, said housing having a first chamber, valve means in said first chamber movable between a first position in which said inlet port is in communication through said chamber with said outlet port and communication between said chamber and said pressure-relief port is closed, and a second position in which communication between said inlet port and said chamber is cut-off and said outlet port is in communication through said chamber with said pressure-relief port, and resilient means for urging said valve means into said first position, said housing having a stepped bore and a second chamber, communicating means between said second chamber and said first chamber open at least when said valve means is in said first position, a differential piston working in said stepped bore in said housing and having opposite ends of greater area and of smaller area, said end of greater area being exposed to said inlet port and said end of smaller area being exposed to said second chamber, said piston having a restricted passage through which said inlet port communicates at all times with said second chamber, said second chamber being located in said housing between said smaller diameter end of said piston and an adjacent inner end of said stepped bore.

2. A control valve assembly as claimed in claim 1, wherein said restricted passage in said piston comprises an axial through bore having at its outer end adjacent to said inlet port means urging said piston away from said inlet port when hydraulic fluid is initially supplied to said inlet, said means comprising an orifice across which a pressure drop occurs when hydraulic fluid is supplied to said inlet port.

3. A control valve assembly as claimed in claim 1, wherein a return spring normally urges said piston into an inoperative position in engagement with said inlet port.

4. A control valve assembly as claimed in claim 1, including anti-skid control means responsive to deceleration of a braked wheel for urging said valve means into said second position when the deceleration of a braked wheel exceeds a predetermined value and a restriction providing communication between said first chamber and said pressure relief port at least when said valve means is in said second position.

5. A control valve assembly as claimed in claim 4, wherein said housing has a second bore between said first chamber and said relief port and a passage through which said second bore communicates with said first chamber at least when said valve means is in said second position, a stop being defined by a step in diameter between said passage and said second bore, a second piston working in said second bore is displaceable in said bore in a direction away from said first chamber said second piston having a restricted passage comprising said restriction, a return spring normally urging said second piston into an advanced position against said stop.

6. A control valve assembly as claimed in claim 5, wherein said second piston has an axial bore comprising said restriction, said axial bore having at its inner end adjacent to said step orifice means across which a pressure drop occurs to urge said second piston away from said stop when said valve means is in said second position.

7. A control valve assembly as claimed in claim 4, wherein said valve means comprises a double-acting valve member of magnetic material and said anti-skid control means comprises a solenoid assembly for urging said valve member into said second position magnetically.

* * * * *